United States Patent [19]

Orrick et al.

[11] Patent Number: 4,893,228

[45] Date of Patent: Jan. 9, 1990

[54] HIGH-EFFICIENCY PROGRAMMABLE POWER SUPPLY

[75] Inventors: Herbert P. Orrick, Rockaway; Siu B. Wong, Randolph, both of N.J.

[73] Assignee: Hewlett Packard Company, Palo Alto, Calif.

[21] Appl. No.: 267,745

[22] Filed: Nov. 2, 1988

Related U.S. Application Data

[63] Continuation of Ser. No. 91,630, Sep. 1, 1987, abandoned.

[51] Int. Cl.$^4$ .......................... H02M 7/04; G05F 1/56
[52] U.S. Cl. ...................................... 363/89; 323/266; 323/268; 323/282; 323/351
[58] Field of Search .................. 363/89; 323/265, 266, 323/268, 274, 275, 350, 351, 269, 270, 271, 272, 273, 279, 282, 283, 284

[56] References Cited

U.S. PATENT DOCUMENTS

| | | | |
|---|---|---|---|
| 3,373,344 | 3/1968 | Seer | 323/266 |
| 3,400,325 | 9/1968 | Webb | 323/266 |
| 3,733,540 | 5/1973 | Hawkins | 363/89 |
| 3,889,177 | 6/1975 | Fendrich | 323/266 |
| 4,754,388 | 6/1988 | Pospisil | 363/89 |

Primary Examiner—Patrick R. Salce
Assistant Examiner—Emanuel Todd
Attorney, Agent, or Firm—Frank R. Perillo

[57] ABSTRACT

A high-efficiency programmable power supply including a linear regulator and a switching pre-regulator. The switching pre-regulator monitors the voltage drop across the series pass regulator pass transistor and maintains a predetermined voltage drop thereacross. The programmable power supply output voltage is varied according to a digital signal applied to the linear regulator. The switching pre-regulator, in providing a generally constant voltage drop across the linear regulator pass transistor, increases efficiency of the power supply by reducing excess voltage which appears at the input of the linear series pass regulator to a minimum level below which the linear regulator can operate. Therefore, the power supply according to the present invention maintains high efficiency over a wide range of selectively programmed output voltages.

6 Claims, 1 Drawing Sheet

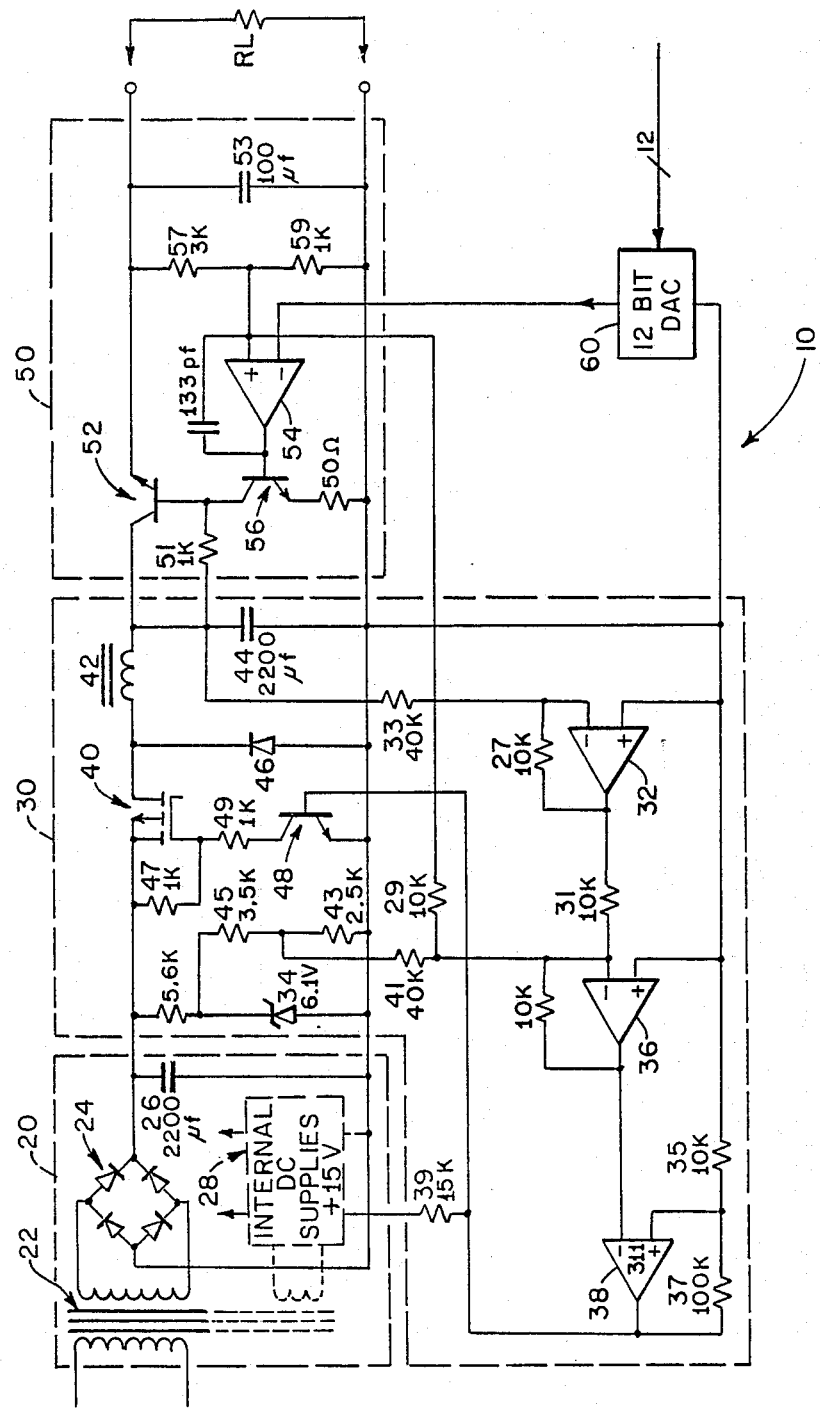

HIGH-EFFICIENCY PROGRAMMABLE POWER SUPPLY

CROSS-REFERENCE TO RELATED APPLICATION

This application is a continuation of application Ser. No. 091,630, filed Sept. 1, 1987, now abandoned.

FIELD OF THE INVENTION

The present invention relates to power supplies and, in particular, programmable power supplies having switching pre-regulators.

BACKGROUND OF THE INVENTION

Generally, power supply regulators typically comprise linear (series pass) and switching-type power supply regulators. Each type has distinct performance characteristics best applied in somewhat different applications. The older and better known linear regulators provide the necessary transient response to respond to rapid changes in power supply load conditions. However, the series pass elements therein typically are wasteful of power, even when optimized to provide a single (non-variable) output potential.

Alternatively, the switching regulator provides the highest level of regulator efficiency, at the expense of a slower response to varying load conditions. Again, while the regulator circuit response time may be optimized for a particular, non-varying output potential and range of load fluctuations, there remains a limiting minimum response time under which the switching regulator is unable to adequately respond.

Limitations of the above-described two classes of power supplies are further exacerbated when the requirement is imposed that the power supplies provide a selectively variable range of output potentials over a range such as 0 to 20 volts. The wide range of output potential makes optimization of either circuit difficult and provides the lowest efficiency of the linear regulator when the lowest range of voltages is selected.

SUMMARY OF THE INVENTION

The present invention provides a high-efficiency, programmable power supply wherein the unregulated direct current is initially pre-regulated by a switching regulator to be followed by a linear (series pass) regulator to provide the selected output voltage. High efficiency is maintained by adjusting the pre-regulator output to maintain a predetermined voltage drop across the linear regulator series pass element. Therefore, as the range of the regulator output is selectively varied, the voltage drop across the series pass element is maintained to a selected low potential difference to enable the series pass element to operate, maintaining the regulator output potential while minimizing the energy dissipated in the linear regulator. Thus, as the linear regulator output voltage decreases, the switching regulator follows the change in the power supply output, offset by the voltage drop across the series pass element, maintaining both a wide operating range and high circuit efficiency.

BRIEF DESCRIPTION OF THE DRAWING

These and further features of the present invention will be better understood by reading the following detailed description, taken together with the drawing, which comprises a schematic diagram of one embodiment of the present invention.

DETAILED DESCRIPTION OF THE INVENTION

The schematic diagram 10 shown in the figure includes a source of unregulated direct current 20 whose output is initially regulated by a switching pre-regulator 30 and subsequently by a linear (series pass) regulator 50 providing a potential across the load $R_L$ according to a twelve-bit digital signal at the control input of DAC 60. The source of unregulated direct current typically includes a power transformer 22, diode bridge 24 and filter capacitor 26 across which the unregulated direct current appears. Furthermore, the amplifiers and digital elements comprising the subsequently described portions of the power supply according to this invention, is powered by a separate source of DC supply which operates independently from the source of unregulated direct current. In the present embodiment, such internal DC supply voltages is provided by an additional secondary winding to the transformer 22 followed by rectifiers and regulators to provide the required DC biased supplies 28, which process the signal provided by the additional winding of transformer 22 according to any currently available power supply design.

The switching pre-regulator 30 includes a series switching transistor 40 which periodically and asynchronously energizes the inductor 42 charging up capacitor 44 from the unregulated direct current. A current flow is maintained through the inductor 42 by diode 46 when the transistor 40 ceases conducting. The circuit inductor and capacitor elements are chosen according to forward switching regulator techniques known in the art. Transistor 40, comprising a P-channel MOSFET power transistor, such as part number MTM 8P10 manufactured by Motorola, is energized by transistor 48 by a signal provided from comparator 38 having an open collector output, whose drive current to the transistor 48 is limited by the load resistor 39 connected to a +15-volt bias supply. The comparator 38 typically comprises a part number 311 of various manufacturers and has a small amount of positive feedback applied thereacross through resistors 37 and 35 to insure rapid and definite switching transition points.

The control of the conduction of the series pass transistor 40 is provided through the operation of the comparator 311 by operation of the amplifier 36 according to a signal derived from the potential difference across the series pass transistor 52 in the linear regulator 50. Amplifier 36 receives a scaled (0.25) signal from the output side of the series pass transistor 52 through resistor 29 and receives a signal representing the inverse polarity of the signal at the input side of the transistor 52 through an amplifier 32 (having resistors 27 and 33 to provide a gain of 0.25). The output of the amplifier 32 is received by the input of the amplifier 36 through a resistor 31, wherein amplifier 36 provides an output signal representing the difference of the potential across the transistor 52. Furthermore, a signal is derived from a Zener reference diode 34 scaled by a voltage divider including resistors 45 and 43 whose output signal is received by amplifier 36 through resistor 41 such that a minimum potential is maintained across the series pass transistor 52 for predictable linear operations over an expected range of load conditions. In the present embodiment, the fixed output potential is maintained at 0.6 volts according to the selection of the fixed signal applied through resistor 41. However, the selected voltage drop across the series pass transistor 52 may be increased to permit the power supply to accommodate more severe load transients.

The pre-regulated output, across capacitor 44, is received by the linear (series pass) regulator 50 which includes a bipolar series pass transistor 52 which is made selectively and variably conductive to provide the desired power supply output potential. The regulator 50 includes driver transistor 56 energized by amplifier 54, which receives a signal representative of the power supply output through a voltage divider ($\times 0.25$) including resistors 57 and 59, as well as receiving an analog control signal provided by a digital-to-analog converter (DAC) 60, which may comprise one of many DAC devices available currently. The DAC is responsive to a 12-bit digital control signal applied externally. The amplifier 54 operates to provide an output signal when the potentials at its input differs, and such output signal causes driver transistor to become selectively conductive, which in combination with resistor 51 applies a variable signal to the control input (base) of transistor 52. Transistor 52, responding to the control input, correspondingly varies the signal at its output (emitter) connection in this embodiment to maintain a signal at the amplifier 54 input (derived from voltage divider resistors 57 and 59) to be substantially identical to the analog control signal provided by the DAC 60. In the present embodiment, the signal provided by the DAC 60 is operable to cause the linear regulator 50 to vary the power supply output potential over the range of 0 to 20 volts.

According to the present invention, when the desired output voltage is selected by imposing the corresponding digital signal to the DAC 60, the linear regulator 50 rapidly responds, and maintains the desired output for a variety of rapidly changing load conditions. Simultaneously, the switching pre-regulator 30 does not respond to the power supply output potential, but responds only to the potential developed across the linear regulator series pass transistor 52. Thus, the pre-regulator output potential accordingly increases or decreases to provide the desired voltage drop across the series pass element 52. The switching pre-regulator 30 comprising an asynchronous forward switching regulator design, is not limited to a particular switching frequency and thus is free to respond as rapidly as switching regulator circuits may respond while maintaining the desired high efficiency of operation. Thus, the present invention combines the most advantageous characteristics of both regulator circuits to provide an efficient, responsive power supply, even at the lower range of output potential range where other programmable power supplies are least efficient.

Therefore, the present invention is not limited by the above description and embodiment and may further include modifications and substitutions made by one of skill in the art. The present invention is not to be limited except by the claims which follow.

What is claimed is:

1. A power supply comprising:
a source of unregulated direct current;
an asynchronous switching pre-regulator receiving said unregulated direct current and providing a pre-regulated direct current output;
a linear regulator receiving said pre-regulated direct current and including a series pass element therein, and selectively providing a regulated output according to an externally applied control signal, wherein
said switching pre-regulator includes means for measuring the voltage drop across the series pass element, and is responsive to the measured voltage drop across said series pass element, providing a selectable pre-regulated direct current potential which maintains a selected voltage drop across said series pass element independent of external periodic signals.

2. The power supply of claim 1, wherein
said switching pre-regulator comprises a forward converter switching regulator.

3. The power supply of claim 1, wherein said linear regulator includes:
a series pass transistor; and
an amplifier connected to selectively activate said series pass transistor according to a signal representative of said regulated output and to said control signal.

4. The power supply of claim 3, wherein
said series pass transistor comprises a bipolar transistor, and the minimum voltage drop across the series pass transistor is 0.6 volts.

5. The power supply of claim 3 wherein
said linear regulator includes a digital-to-analog converter providing an analog signal to said amplifier, and receives a digital control signal as said control signal.

6. A power supply comprising:
a source of unregulated direct current;
an asynchronous switching pre-regulator receiving said unregulated direct current and providing a pre-regulated direct current output;
a linear regulator receiving said pre-regulated direct current and including a series pass element therein, and selectively providing a regulated output, wherein
said switching pre-regulator includes means for measuring the voltage drop across the series pass element, and is responsive to the measured voltage drop across said series pass element, providing a selectable pre-regulated direct current potential which maintains a selected voltage drop across said series pass element independent of external periodic signals.

* * * * *